United States Patent

Betz et al.

Patent Number: 5,506,479
Date of Patent: Apr. 9, 1996

[54] DEVICE FOR OPERATING A GAS-DISCHARGE LAMP

[75] Inventors: Dieter Betz, Vaihingen/Enz; Wolfgang Mark, Ditzingen/Schoeckingen, both of Germany

[73] Assignee: Robert Bosch GmbH, Stuttgart, Germany

[21] Appl. No.: 190,085
[22] PCT Filed: Aug. 4, 1992
[86] PCT No.: PCT/DE92/00645
§ 371 Date: Feb. 1, 1994
§ 102(e) Date: Feb. 1, 1994
[87] PCT Pub. No.: WO93/04569
PCT Pub. Date: Mar. 4, 1994

[30] Foreign Application Priority Data

Aug. 23, 1991 [DE] Germany ............ 41 27 970.0

[51] Int. Cl.⁶ .................................. H05B 41/16
[52] U.S. Cl. ........................... 315/283; 315/289
[58] Field of Search ..................... 315/289, 290, 315/246, 283, 281, 290

[56] References Cited

U.S. PATENT DOCUMENTS 3,555,352 1/1971 Michalski .................. 315/289
3,963,958 6/1976 Nuckolls .................... 315/289

FOREIGN PATENT DOCUMENTS

0185149A1 6/1986 European Pat. Off. .
0411617A2 2/1991 European Pat. Off. .
1255401 12/1971 United Kingdom .
91/03919 3/1991 WIPO .

Primary Examiner—Robert J. Pascal
Assistant Examiner—Michael Shingleton
Attorney, Agent, or Firm—Spencer, Frank & Schneider

[57] ABSTRACT

A device for operating a gas discharge lamp (11) which is triggered by pulses which are transmitted by a starting device (14). In order to isolate the electrical components of a ballast (12) or a power supply apparatus (10) during the starting process, a reactor (13) which is constructed as a saturable reactor is provided in the ballast. The inductance of the saturable reactor is reduced by the operating current flowing after starting of the lamp (11). The device according to the invention is particularly suitable for starting high-pressure gas discharge lamps, the starting power of the lamp (11) made available by the starting device (14) being made virtually completely available.

1 Claim, 1 Drawing Sheet

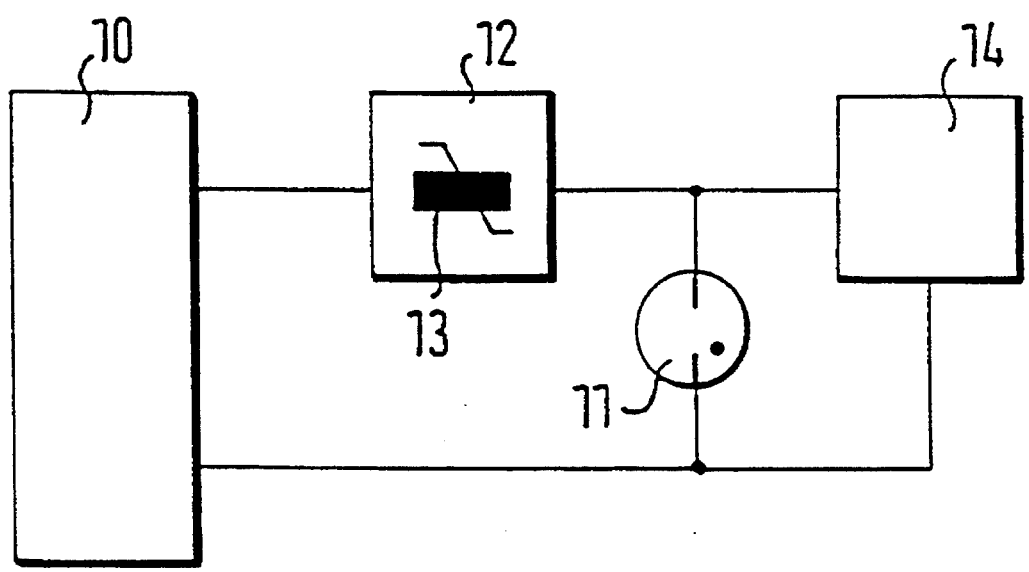

DEVICE FOR OPERATING A GAS-DISCHARGE LAMP

PRIOR ART

The invention proceeds from a device for operating a gas discharge lamp according to the generic concept of the patent claim. German Offenlegungsschrift 3,929,029 discloses such a device in which a gas discharge lamp is connected to a power supply apparatus via a ballast which contains a reactor. Furthermore, a device for starting the gas discharge lamp is directly connected to the lamp. The reactor contained in the ballast fixes the current flowing when the gas discharge lamp is in operation, for example, or limits at least the current to a prescribed maximum value.

The starting device makes available one or more trigger pulses whose energy must suffice for reliable starting of the gas discharge lamp. In the known device, it cannot be ruled out that a certain portion of the starting power is coupled into the ballast and is therefore no longer available for starting the lamp.

It is the object of the invention to specify a device for operating a gas discharge lamp, in which the starting power applied by a starting device is made available as completely as possible for starting a gas discharge lamp.

SUMMARY OF THE INVENTION

The above object is achieved, according to the invention, by a device for operating a gas discharge lamp having a ballast for the power supply of the lamp, which ballast contains a reactor connector in series with the lamp, and having a starting device connected to the lamp, and wherein the reactor is a saturable reactor whose inductance is reduced by the lamp operating current flowing after starting or ignition of the lamp.

ADVANTAGES OF THE INVENTION

The device according to the invention has the advantage that the starting power of the lamp that is made available by the starting device is made completely available, so that a cost-effective design of the starting device is possible. Electrical components which are contained in the ballast do not need to be designed for the high starting voltages produced during the starting process.

The device according to the invention is particularly suitable for starting high-pressure gas discharge lamps which require a comparatively high starting voltage and a high starting power, especially when the lamp is at operating temperature.

BRIEF DESCRIPTION OF THE DRAWING

The device according to the invention is explained in more detail below with reference to the drawing wherein the FIGURE is a block circuit diagram of the device according to the invention.

DETAILED DESCRIPTION OF THE PREFERRED EMBODIMENT

The FIGURE shows a power supply apparatus 10 which provides the voltages and currents required for the power supply of a gas discharge lamp 11. The power supply apparatus 10 is connected to the lamp 11 via a ballast 12.

Provided for starting the lamp 11 is a starting device 14 which transmits a trigger pulse whose voltage and whose energy content suffices for starting the lamp 11. Starting the lamp 11 is triggered by a control device, not shown in the FIGURE, which also controls the power supply apparatus 10, if necessary.

When the starting device 14 transmits one or more trigger pulses, apart from the lamp 11 the ballast 12 is also subjected to corresponding pulses. It is provided according to the invention that the reactor 13 contained in the ballast 12 has a nonlinear characteristic. The reactor 13 is designated below as a saturable reactor. This method ensures an isolation of the starting circuit containing the starting device 14 and the lamp 11 from further electrical components of the ballast 12 and of the power supply apparatus 10 during starting of the lamp. The saturable reactor 13 is to be designed in this case such that for a low current, the maximum of which can be reached during the starting process owing to the short voltage pulse, the inductance assumes a high value which corresponds to the value of the non-saturated reactor. The comparatively high operating current flowing after starting of the lamp is intended, by contrast, to lead to saturation of the reactor 13 and thus to a decrease in its inductance. The supply of the lamp with electrical power is therefore possible during burning operation without the essential limitation owing to the saturable reactor 13.

The saturable reactor 13 can be provided by a winding which is surrounded by magnetisable material which is at least partially saturated by the high magnetic field strength when the operating current of the lamp 11 is flowing, so that the magnetic induction can no longer rise in proportion to the magnetic field strength.

We claim:

1. A circuit arrangement for a gas discharge lamp, comprising: a gas discharge lamp; a starting device, for supplying trigger pulses to the gas discharge lamp during starting, connected in parallel with the gas discharge lamp; and a ballast for the power supply of the lamp, which ballast contains a non-linear reactor connected to the lamp in series with the lamp and the power supply, with the reactor being a saturable reactor whose inductance assumes a high value corresponding to that of the non-saturated reactor during the starting of the lamp and is reduced by the lamp operating current flowing after starting of the lamp.

* * * * *